(12) United States Patent
Srinivasan et al.

(10) Patent No.: US 11,381,515 B2
(45) Date of Patent: Jul. 5, 2022

(54) ON-DEMAND PACKET QUEUING IN A NETWORK DEVICE

(71) Applicant: Intel Corporation, Santa Clara, CA (US)

(72) Inventors: Arvind Srinivasan, San Jose, CA (US); Robert Southworth, Chatsworth, CA (US); Helia A. Naeimi, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/550,007

(22) Filed: Aug. 23, 2019

(65) Prior Publication Data

US 2019/0379610 A1    Dec. 12, 2019

Related U.S. Application Data

(60) Provisional application No. 62/868,700, filed on Jun. 28, 2019.

(51) Int. Cl.
*H04L 47/625* (2022.01)
*H04L 47/11* (2022.01)
*H04L 47/32* (2022.01)

(52) U.S. Cl.
CPC ......... *H04L 47/6255* (2013.01); *H04L 47/11* (2013.01); *H04L 47/32* (2013.01); *H04L 47/627* (2013.01)

(58) Field of Classification Search
CPC ..... H04L 47/6255; H04L 47/11; H04L 47/32; H04L 47/627
See application file for complete search history.

(56) References Cited

U.S. PATENT DOCUMENTS

| 7,957,394 B1* | 6/2011 | Cohen | H04L 41/0806 370/230.1 |
| 10,270,564 B2* | 4/2019 | Djukic | H04L 1/1896 |
| 2002/0194350 A1* | 12/2002 | Lu | H04L 47/19 709/229 |

(Continued)

OTHER PUBLICATIONS

Cisco, "Classification of Wireless Quality of Service (QoS) and Queue Mapping on ISA550W and ISA570W Integrated Security Appliances", Document ID: SMB3245, Nov. 2018, 5 pages.

(Continued)

*Primary Examiner* — Afshawn M Towfighi
(74) *Attorney, Agent, or Firm* — Compass IP Law PC

(57) ABSTRACT

Examples herein relate to allocation of an intermediate queue to a flow or traffic class (or other allocation) of packets prior to transmission to a network. Various types of intermediate queues are available for selection. An intermediate queue can be shallow and have an associated throughput that attempts to meet or exceed latency guarantees for a packet flow or traffic class. Another intermediate queue is larger in size and expandable and can be used for packets that are sensitive to egress port incast such as latency sensitive packets. Yet another intermediate queue is expandable but provides no guarantee on maximum end-to-end latency and can be used for packets where dropping is to be avoided. Intermediate queues can be deallocated after a flow or traffic class ends and related memory space can be used for another intermediate queue.

22 Claims, 8 Drawing Sheets

(56) References Cited

U.S. PATENT DOCUMENTS

| | | | | |
|---|---|---|---|---|
| 2003/0112817 | A1* | 6/2003 | Woo | H04L 47/17 |
| | | | | 370/413 |
| 2011/0268052 | A1* | 11/2011 | Koc | H04L 5/003 |
| | | | | 370/329 |
| 2012/0218894 | A1* | 8/2012 | Assarpour | H04L 49/65 |
| | | | | 370/235 |
| 2013/0007386 | A1* | 1/2013 | Wolf | G06F 13/1605 |
| | | | | 711/158 |
| 2018/0302328 | A1* | 10/2018 | Keith | H04L 47/24 |
| 2021/0392092 | A1* | 12/2021 | Yuan | H04L 47/562 |

OTHER PUBLICATIONS

Zahirul Islam et al., "A comparative analysis on traditional Queuing and Hybrid Queuing Mechanism of VoIP's QoS Properties", International Journal of Advanced Innovations, Thoughts and Ideas (IJAITI), Beyond Limits, vol. 2, Issue 2, May 2012, 9 pages.

Zhenzhen Yan et al., "On How to Provision Quality of Service (QoS) for Large Dataset Transfers", CTRQ 2013: The Sixth International Conference on Communication Theory, Reliability, and Quality of Service, ISBN: 978-1-61208-263-9, Apr. 2013, 9 pages.

Balchunas, Aaron, "—QoS and Queuing—", QoS and Queuing v1.31, 2010, 10 pages.

Csico, "Cisco Nexus 7000 Series NX-OS Quality of Service Configuration Guide, Release 5.x", https://www.cisco.com/c/en/us/td/docs/switches/datacenter/sw/5_x/nx-os/qos/configuration/guide/nx-os_qos_book/queuing.html, Jan. 30, 2018, 30 pages.

* cited by examiner

ON-DEMAND PACKET QUEUING IN A NETWORK DEVICE

RELATED APPLICATION

The present application claims the benefit of priority date of U.S. provisional patent application Ser. No. 62/868,700, filed Jun. 28, 2019, the entire disclosure of which is incorporated herein by reference.

TECHNICAL FIELD

Various examples described herein relate to packet queueing in a network connected device.

BACKGROUND

Remote direct memory access (RDMA) aware networks are the basis of emerging high performance traffic (including storage traffic) in a data center network. Unregulated traffic flow can lead to congestion build up in the network thereby resulting in packet drops and/or longer message completion times. Application performance depends on network provisioning and quality of service (QoS). However, with evolving workloads, network buffer management is challenging and lack of proper provisioning can degrade application performance. In switches, currently, queues are statically provisioned and do not account for the dynamic nature of workload and demands of associated packet traffic.

DETAILED DESCRIPTION

Various embodiments provide on-demand and dynamic packet queue allocation based on one or more of: traffic class, packet flow types, classification, congestion, end-to-end latency requirements, or packet drop requirements. Various embodiments allow a network device to dynamically switch between at least three types of intermediate queues between ingress and egress ports, namely, ultra-low latency queue, a shallow queue that can expand, or an initially deep queue that can expand. Dynamic intermediate queue allocation can provide enhancement of application performance and lower latency for traffic processed in data centers to help with meeting associated service level agreements (SLAs).

Various embodiments provide allocation of an intermediate queue to a flow or traffic class (or other allocation) of packets prior to transmission to a network. Various types of intermediate queues are available for selection and intermediate queues can be allocated in a memory region accessible to an egress subsystem of a network device. A first type of intermediate queue can be shallow in depth and have an associated throughput that attempts to meet or exceed latency guarantees for a packet flow or traffic class. A second type of intermediate queue is larger in size than a size of the first type of intermediate queue and is expandable and can be used for packets that are sensitive to egress port incast such as latency sensitive packets. A third type of intermediate queue is larger in size than the first or second types and expandable but provides no guarantee on maximum end-to-end latency and can be used for packets where dropping is to be avoided. Various embodiments provide for deallocation of an intermediate queue after a flow or traffic class ends or if a higher priority flow or traffic class is received and needs an intermediate queue for use.

Figure 1:
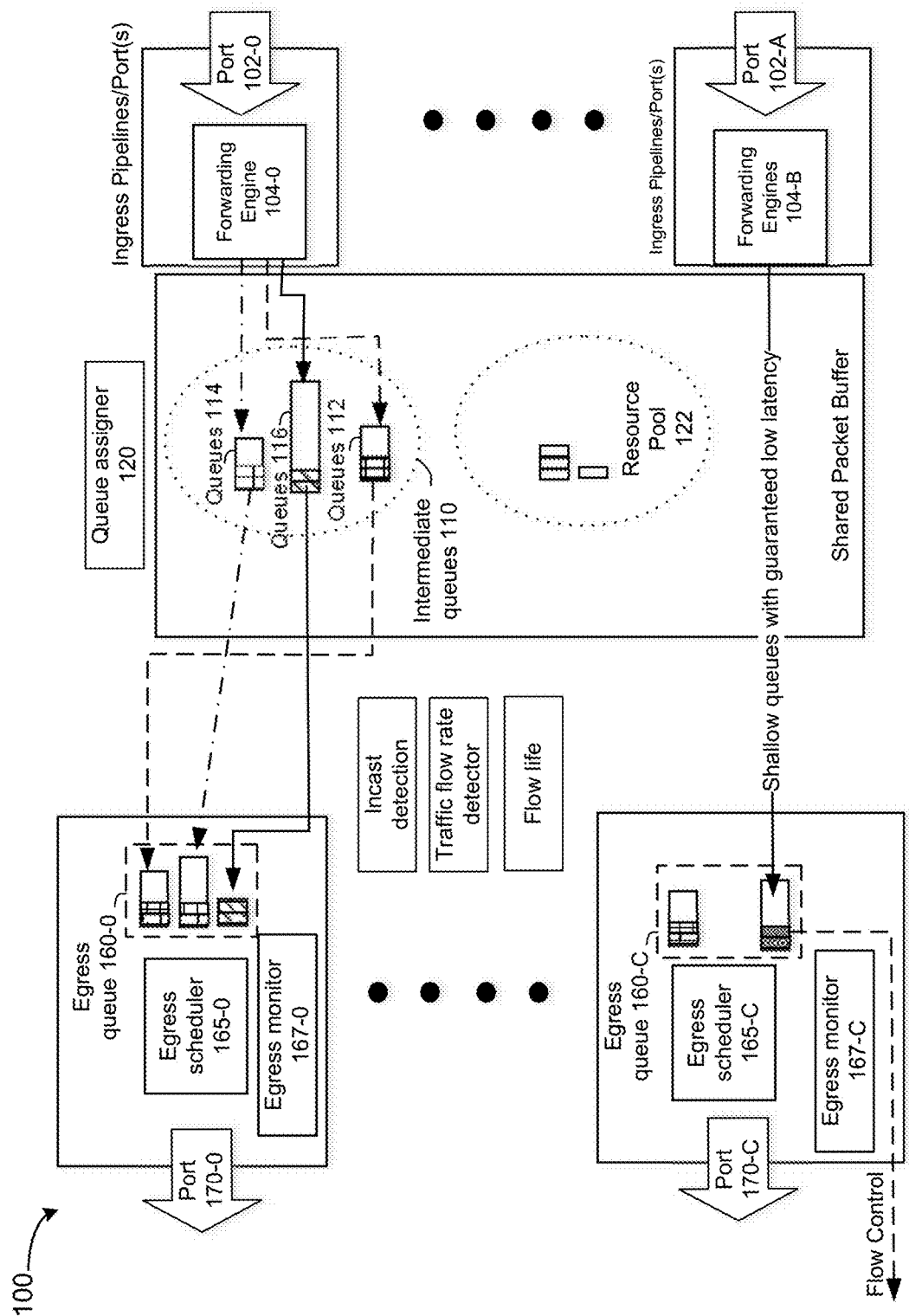
FIG. 1 shows a switch with dynamic queues structures.

FIG. 1 shows a switch with dynamic queues structures. Embodiments can be used in any network device where packets are queued prior to egress to a network, fabric, interconnect, bus, or other wired or wireless medium. A network device can include one or more of a network interface, switch, fabric interface, switch buffer, an interface to interconnect, an interface to a bus, device to provide communication with a satellite network. There can be three distinct subsystems of the switch: ingress pipeline, shared packet buffers, and egress pipeline. Various embodiments provide intermediate packet queueing that spans across multiple subsystems.

Switch 100 uses ingress ports 102-0 to 102-A to receive packets from a network medium (e.g., wired or wireless), where A≥0. Ingress port 102 refers to any or all of ingress ports 102-0 to 102-A. Ingress ports 102-0 to 102-A can each have an associated forwarding engine 104-0 to 104-B, where B≥0. Forwarding engine 104 refers to any or all of forwarding engines 104-0 to 104-B. Forwarding engine 104 can determine an egress port among egress ports 170-0 to 170-C to forward a received packet based on characteristics of the packet. For example, forwarding engine 104 can forward a packet received at ingress port 102 to an egress port 170 based on characteristics of the received packet header such as destination Internet Protocol (IP) address or destination media access control (MAC) address. Egress port 170 refers to any of egress ports 170-0 to 170-C, where C≥0. In an embodiment, forwarding engine 104 can determine which intermediate queue 110 and egress queue 160 to associate with an egress port 170 to enqueue a reference (e.g., pointer) to the received packet or a portion of the received packet.

Switch 100 can be configured to provide from at least three options for intermediate queues 110 for received packets that are to be transmitted from any egress port 170. An intermediate queue 110 can be chosen based on flow classification identified from a received packet's header, packet flow types, packet classification, level of congestion at an egress port (e.g., at or above a threshold level), end-to-end latency guarantee for the packet, incast level or occurrence at an egress port 170, traffic receive rate for a flow, egress rate consumed, ingress rate consumed, or packet drop requirements (e.g., access control list). A flow can refer to packets or frames transmitted from a source (e.g., device (e.g., processor or accelerator), application, virtual machine, container) to a destination (e.g., device (e.g., processor or accelerator), application, virtual machine, container) according to any protocol such as transmission control protocol (TCP), remote direct memory access (RDMA) (including RDMA over converged Ethernet (RoCE)), User Datagram Protocol (UDP), Internet Wide Area RDMA Protocol (iWARP), and so forth. A flow can be determined based on any packet characteristics include a 5 tuple, source IP address, destination IP address, source MAC address, destination (Media Access Control) MAC address, Ethernet type, virtual local area network (VLAN) tag, Internet Protocol (IP) addresses, Multiprotocol Label Switching (MPLS)

labels, application designation, and so forth. In some embodiments, an intermediate queue assignment policy can be set by a pod manager, control plane, hypervisor, virtual machine manager, or intelligent data plane or set by a network administrator.

Intermediate queues 110 can be provided for buffering packets received from an ingress port 102 before or while an assignment is made of packets to an egress port 170 and corresponding egress queue 160 from which packets are scheduled for transmission from an egress port 170. Intermediate queues 110 represents one or more buffers in a system memory that are allocated for storing portions of packets available for transmission, including packets received through ingress port 102, but can include packets provided for egress from an endpoint transmitter from a computing platform or network interface. A physical resource such as a static random access memories (SRAMs) or first-in-first out queues (FIFOs) which are limited in size can be allocated for intermediate queue 110. Intermediate queues 110 can be allocated in an internal or external dynamic random access memory (DRAM) or other type of cache or volatile or non-volatile memory that can have larger capacity than an SRAM or FIFO. Intermediate queues 110 can scale into very large queues using external DRAM (or other types of cache or volatile or non-volatile memory) and provide a much larger pool of flexible queues.

Forwarding engine 104 for an ingress port 102 can request queue assigner 120 for use of an intermediate queue for a received packet. Queue assigner 120 looks at a free pool of intermediate queues and determines a packet's flow and particular intermediate queue based on a policy set for a flow (or other packet group association). For example, for a first packet in a particular flow with an allocated intermediate queue 110, queue assigner 120 can select an intermediate queue 110 for the flow and direct packets in the particular flow to the allocated intermediate queue 110.

A first option intermediate queue 112 provides a shallow intermediate queue with a guaranteed latency for a packet to be egressed, e.g., guaranteed maximum ingress-to-egress port latency time (such as at least an average throughput level) or a time to egress the packet after it is stored in intermediate queue 112. First option intermediate queue 112 provides shallow queues and provides for low latency flow forwarding. Among intermediate queues 110, first option intermediate queue 112 provides the lowest available latency prior to egress. First option intermediate queue 112 can be provided on the egress side of switch 100 such that the packet is placed directly into an egress queue 160 associated with an egress port 170 without use of an intermediate queue. In some examples, packets allocated to first option intermediate queue 112 are later copied or associated with an egress queue 160 for egress from an egress port 170. First option intermediate queue 112 can be allocated in a shared memory also used by intermediate queues 110 and/or egress queues 160.

A polling rate of a processor (e.g., egress scheduler) and allocated clock cycles are set for processing and egressing packets from first option intermediate queue 112 or associated egress queue 160 to an egress port 170 at a rate that is acceptable under the guaranteed latency for the packets that are to use first option intermediate queue 112. In some embodiments, the size of the first option intermediate queue 112 does not change and does not expand for a flow or other association of packets. For packets allocated to first option intermediate queue 112, dropping of packets received at an ingress port due to overflow of first option intermediate queue 110 is acceptable.

Second option intermediate queue 114 provides an intermediate queue that is relatively shallow but extendable in size to store more packets and attempt to avoid packet drops. A packet drop can include not storing a packet and not egressing the packet. Dropping a packet can lead to re-transmission of the dropped packet under some protocols (e.g., RDMA or Transmission control protocol (TCP)). Use of second option intermediate queue 114 can provide best effort and low latency egressing. In the event of egress port congestion, a next tier of latency can be used. For second option intermediate queue 114, the lowest latency occurs when there is no egress port congestion or incast. However, if egress port congestion or incast is encountered, then the latency will grow but latency will be bounded based on the total queue size and scheduling policy. At least in that sense, second option intermediate queue 114 provides a best effort and low latency queue. A polling rate of a processor and allocated clock cycles are set for processing and egressing packets from second option intermediate queue 114 or associated egress queue 160 to an egress port 170 at a rate that is at or under the bounded latency for the packets that are to use second option intermediate queue 114.

Second option intermediate queue 114 can be allocated to packets with sensitivity to incast (e.g., more traffic to egress port than egress port can egress at line rate). Second option intermediate queue 114 is extendable in the event of congestion event or incast detection. Types of packets that are sensitive to incast or congestion can be specified by policy. Flows marked by an application and controller (e.g., software defined networking (SDN) controller) may be marked to be sensitive and prioritized accordingly. The routing for some of the flows may be statically set as an example to avoid congestion generically. But they may need to be prioritized and/or queued accordingly.

Second option intermediate queue 114 can be increased in size to accommodate incast to give time for an egress port 170 to egress a packet and to avoid dropping the packet. Second option intermediate queue 114 can be limited in size beyond which either received packets are dropped or flow controls are enabled (or both). Flow control can cause a transmitter or source of packets to switch 100 to reduce its rate of transmission so that congestion can be reduced at switch 100. For example, congestion can be identified when an egress queue has a fill level that is too high (e.g., at or above a threshold). The congestion-causing packet that caused a fill level of a queue to meet or exceed a threshold could be used to identify an endpoint transmitter that transmitted the congestion-causing packet for example using a source IP address and source MAC address specified in the congestion-causing packet. A congestion or flow control message can be sent to the congestion endpoint transmitter that transmitted a packet that caused congestion.

Queue extension can occur in the event of incast of an egress port to which second option intermediate queue 114 is to provide packets for egress. Intermediate queues 110 exist as part of a shared memory in the switch buffers. Queue contexts are carried on both ingress and egress pipelines. From a packet queuing standpoint, the ingress port deposits packets into shared memory for allocation to a second option intermediate queue 114 and then egress scheduler 150 for an egress port 170 schedules the packets for transmission as needed (e.g., by sending a pointer or reference to the egress queue or port to pull a packet from memory). This gives an ability to grow queues if needed when an incast or congestion is detected.

Third option intermediate queue 116 provides an intermediate queue that is an initial deepest size queue compared to the first and second intermediate queues and can extend until its size hits a limit. Third option intermediate queue 116 can be used for packets with a goal of reduced tail latency. Tail latency can be a worst-case latency seen at very low probability. Tail latency can be measured from a cumulative probability distribution. These are virtual queues built in a shared packet buffer memory. Third option intermediate queue 116 can be assigned dynamically to any port that are experiences congestion and microbursts. Third option intermediate queue 116 have the following properties that can be administratively set: size of queue and port association. Size of queue can have a limit set on the queue beyond which either the packets are dropped or flow controls are enabled. Switch 100 maintains third option intermediate queue 116 as a resource and assigns to queue/flow on-demand based on traffic profiles.

Packets allocated to third option intermediate queue 116 are highly sensitive to not being dropped but do not require a guarantee on maximum end-to-end latency or time to egress. If any drop is imminent due to congestion in an egress port from which packets from third option intermediate queue 116 are to be egressed, then third option intermediate queue 116 is extended in size and uses more of shared memory. Explicit congestion notification (ECN) or flow control can be triggered in a case of overflow of third option intermediate queue 116 to reduce a rate of packets received at switch that are to be egressed from a congested egress port.

Note that in some cases, no intermediate queue is allocated to a packet that is to egress from an egress port 170. For example, packets are routed to any available intermediate queue separate from intermediate queues 112-116 or an egress queue 160 associated with an egress port. For such intermediate queues, there is no guaranteed maximum ingress-to-egress port latency time or a time to egress the packet after it is stored in intermediate queue egress rate, or attempt to avoid dropping packets.

Multiple instances of any of the first, second or third option intermediate queues are available subject to limits on space allocated to intermediate queues 110 and available space in resource pool 122 in shared memory.

Egress schedulers 165-0 to 165-C can determine when and which packets to egress from associated egress queue 160-0 to 160-C to allocate egress bandwidth to packet flows or traffic classes. Egress scheduler 165 can refer to any or all of egress schedulers 165-0 to 165-C and egress queue 160 can refer to any or all of egress queues 160-0 to 160-C. In some implementations, an egress scheduler can be allocated to handle egress of packets from one or multiple ports. Egress scheduler 165 apply access control list (ACL) to determine which packets to drop and not egress.

At egress, packets can be provided in an Ethernet frame, or communications compatible with RDMA, InfiniBand, Internet Wide Area RDMA Protocol (iWARP), quick UDP Internet Connections (QUIC), or RDMA over Converged Ethernet (RoCE). Data and logs can be stored to virtualized storage nodes using a protocol such as NVMe over Fabrics (NVMe-oF). A network, fabric, interconnect, bus, or medium that is to receive a packet can be compatible at least with Ethernet, PCIe, Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, CCIX, 3GPP Long Term Evolution (LTE) (4G), 3GPP 5G, and variations thereof.

Egress monitor 167 can represent any or all of egress monitors 167-0 to 167-C. Egress monitor 167 can associated with one or more egress ports 170. Egress monitor 167 can determine telemetry information such as whether incast at any egress port is detected, incast level, a flow rate out of any egress port, bandwidth utilized by a specific flow (e.g., low latency flow, remote direct memory access (RDMA) flow, TCP flow), or other egress port condition information. Egress monitor 167 can provide telemetry information to queue assigner 120 to deallocate or reallocate intermediate queues to a flow or packet association.

The following describes various non-limiting examples of policies set by a software defined networking (SDN) controller or other software or device on which intermediate queue to use for an association of one or more packets. Any policy can be set by an SDN for allocating intermediate queues in shared memory to packets prior to packet receipt and prior to egress. In these examples, a duration of flow, congestion sensitivity, and number of drops can be considered to determine what type of intermediate queue to allocate to an association of packets (e.g., flow or traffic class), although any factors can be considered. For example, if a low latency flow is congested, an applied policy can determine to use first option intermediate queue 112 to increase egress rate or use second option intermediate queue 114 to avoid packet drops until congestion is relieved. Another applied policy is for a long-lived flow that involves allocating first option intermediate queue 112, allowing packet drops therefrom, and letting a transmission control protocol (TCP) flow to react to drops for example by re-transmission of dropped packets. Another applied policy is for short lived flow, whereby third option intermediate queue 116 is allocated to try to prevent packet drops and latency from packet re-transmissions.

An applied policy that attempts to achieve lower end-to-end latency for a flow or traffic class can assign higher priority intermediate queues (e.g., first option intermediate queue 112). Another applied policy is for multiple flows sharing an intermediate queue and allowing the intermediate queue to grow or moving a flow or flows to another intermediate or egress queue and setting up another intermediate queue that is shared or unshared. Third option intermediate queue 116 can be used and shared by multiple associations of packets where latency is not a concern. Third option intermediate queue 116 can expand in size to allow for queueing packets without drops.

Note that intermediate queues can be allocated for any egress queue and multiple intermediate queues can be allocated for any egress port subject to limit on number of total intermediate queue size in shared memory.

Figure 2:
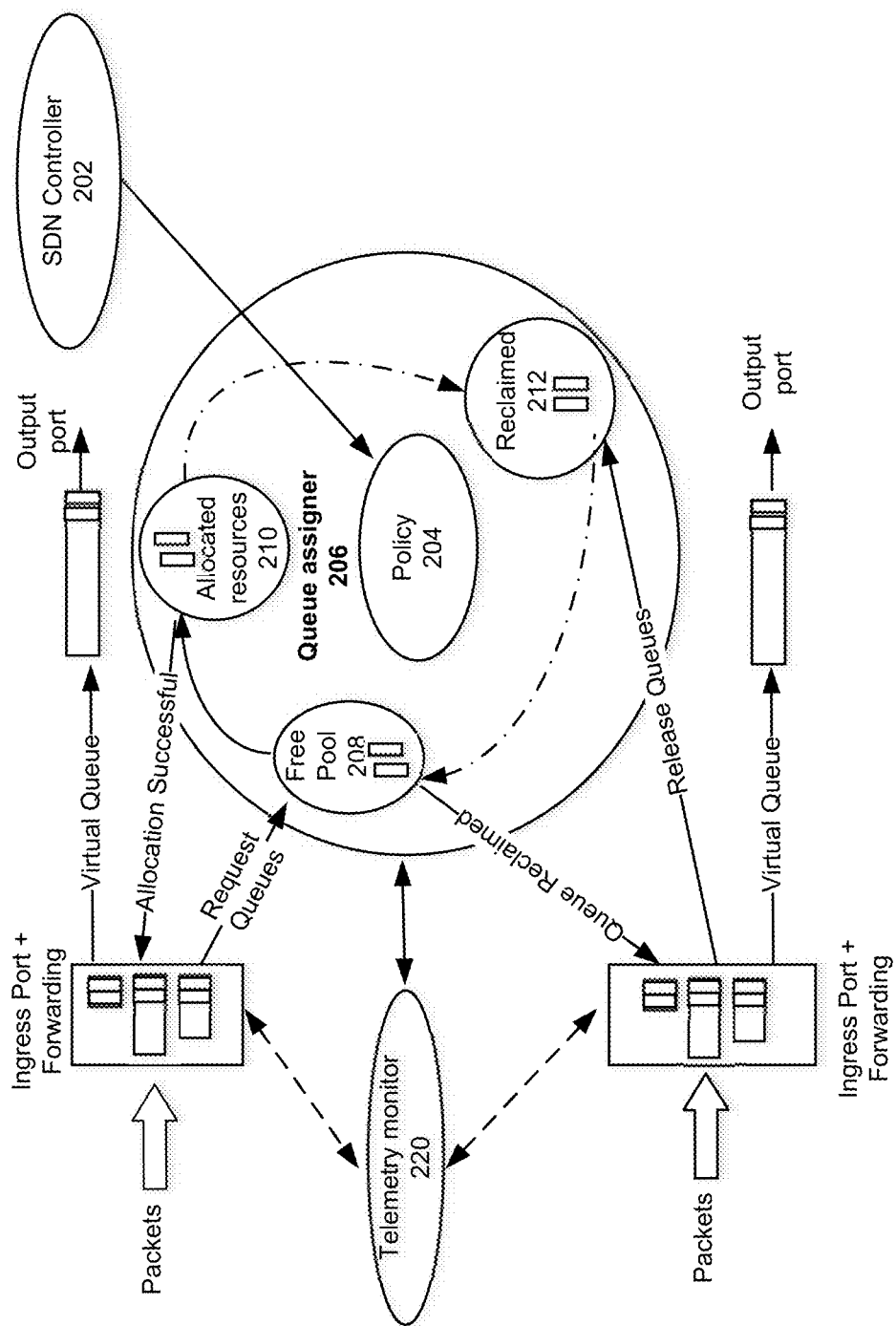
FIG. 2 depicts a system for allocation of intermediate or egress queues to an association of packets.

FIG. 2 depicts a system for allocation of intermediate or egress queues to an association of packets. The intermediate queues can be configured dynamically based on latency, flow duration, or drop requirements of a packet or group of packets (e.g., flow or traffic class). For any given group of packets, queue assignment is made using hardware, firmware, or software control policy 204 where the policy may be preset by a software defined networking (SDN) controller 202. In addition, the queues will have a separate QoS (e.g., type of intermediate queue) controls that can be set by SDN controller 202. SDN controller 202 can be a central entity in data center manager (e.g., pod manager) or an administrator. In general, the intermediate queues are presented as hardware resources that can be assigned and reclaimed based on traffic profile (e.g., congestion, flow duration, packet drops, and so forth).

The resource allocation is centrally managed within the switch system using, for example, queue assigner 206. A forwarding engine for an ingress port can issue request to queue assigner 206 (shown as "Request Queues") for use of an intermediate queue. Queue assigner 206 looks at free pool 208 of intermediate queues and determines a packet's flow and particular intermediate queue. When a new flow is set up and queues are being selected, packets for new flow are placed into a default queue (e.g., a shallow queue) (not shown) until a decision of which intermediate queue to use. After deciding what type of intermediate queue to use, the default queue can be relabeled or identified as the decided type and queue assigner 206 will identify an allocated size of intermediate queue in allocated resource 210. A decision on an intermediate queue to use is made rapidly to prevent overflow of the default queue. The selected intermediate queue becomes allocated by a particular traffic flow or flows. Queues assigner 206 provides a response to the Request Queues by providing an indication of "Allocation Successful" to indicate an intermediate queue was allocated in response to the request.

Telemetry monitor 220 can measure traffic flows and detect incast, egress port congestion, and/or ingress port congestion. Telemetry monitor may assist queue assigner 206 on whether to change an intermediate queue for a flow or flows or other association of packets. Examples of telemetry that is monitored include: congestion at egress port, bandwidth utilization at ingress port, bandwidth utilization at egress port, bandwidth utilized by a specific flow (e.g., low latency flow, remote direct memory access (RDMA) flow, TCP flow), or incast level. For example, based on congestion at an egress port from which packets are to egress from an allocated queue or incast detection at an egress port from which packets are to egress from an allocated queue, queue assigner 206 can allocate additional resources to a second or third type of intermediate queue to attempt to avoid packet drops. Based on lack of congestion and no incast at an egress port, queue assigner 206 can de-allocate resources from an expanded second or third type of queue to free resources (e.g., Free pool 208 or reclaimed 212) for use by other flows or queues that may need to expand.

The following describes an example of intermediate queue release. If a higher priority flow is received and policy 204 indicates that the higher priority flow is to receive an intermediate queue even if there is insufficient intermediate queue resources, queue assigner 206 can release an intermediate queue from use by another lower priority flow, that does not have a policy that prevents deallocation of its intermediate queue, and provide the queue for use in free pool 208 and available for use by a higher priority flow. Queue assigner 206 can allocate free intermediate queue resources to the higher priority flow and identify the allocated resources in allocated resources 210.

In another example, a forwarding engine for an ingress port can inform queue assigner to release use of an intermediate queue (shown as "Release Queues") if a packet flow ends, a marker indicates a flow is to be terminated or ends, or the packet flow is idle for a time amount set by policy 204. Any queue slots available to the released intermediate queue can be available in free pool 208 for use by another allocated expandable queue or a new yet-to-be allocated queue in free pool 208. Any allocated queues resources are identified in allocated resources 210. Queue assigner 206 can respond to forwarding engine that a queue was reclaimed (shown as "Queue Reclaimed").

Figure 3:
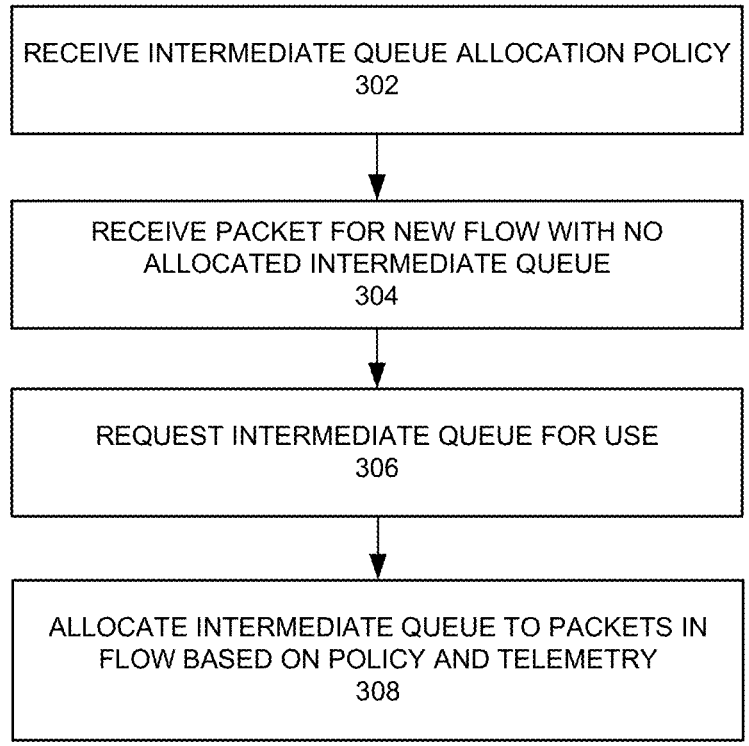
FIG. 3 depicts an example process.

FIG. 3 depicts an example process. The process can be performed by a network device to allocate or deallocate resources for packets that are to egress to a network, fabric, interconnect, bus, and so forth. At 302, an intermediate queue allocation policy is received. An SDN controller executed in the same rack or data center as the switch or a different rack or data center can provide the policy to specify what type of queue to allocate to a flow or traffic class (or other association of packets). For example, a flow or traffic class can be identified as latency sensitive, avoid dropping a packet, a short or long lived flow (e.g., duration of flow), among congestion sensitivity.

At 304, a packet is received for a new flow at an ingress port with no allocated intermediate queue. At 306, based on an applicable policy for the new flow, use of an intermediate queue can be requested. A forwarding engine can request use of an intermediate queue from a queue allocator. An intermediate queue can be allocated in shared memory. A pool of intermediate queues are available for allocation to one or more egress ports and one or more egress queues for the same egress port or different egress ports.

At 308, an intermediate queue can be allocated for packets in the new flow based on an applicable policy and telemetry. Based on the applicable policy, the intermediate queue can be selected from a pool of available queue resources or cause another flow to lose use of a queue. In some examples, the packets of a new flow are placed in a temporary intermediate queue while a decision is made for which type of intermediate queue to allocate to the flow, if any, and the temporary intermediate queue is re-labeled as the selected type of intermediate queue.

As stated earlier, a duration of flow, congestion sensitivity, and number of drops can be considered to determine what type of intermediate queue to allocate to an association of packets (e.g., flow or traffic class), although any factors can be considered. A first option intermediate queue that is shallow and has a latency guarantee can be used for latency sensitive traffic or long-lived flow. A medium sized queue that is expandable can be used for less latency sensitive flows. A larger sized queue that is expandable can be used where packet drops are to be avoided.

Figure 4:
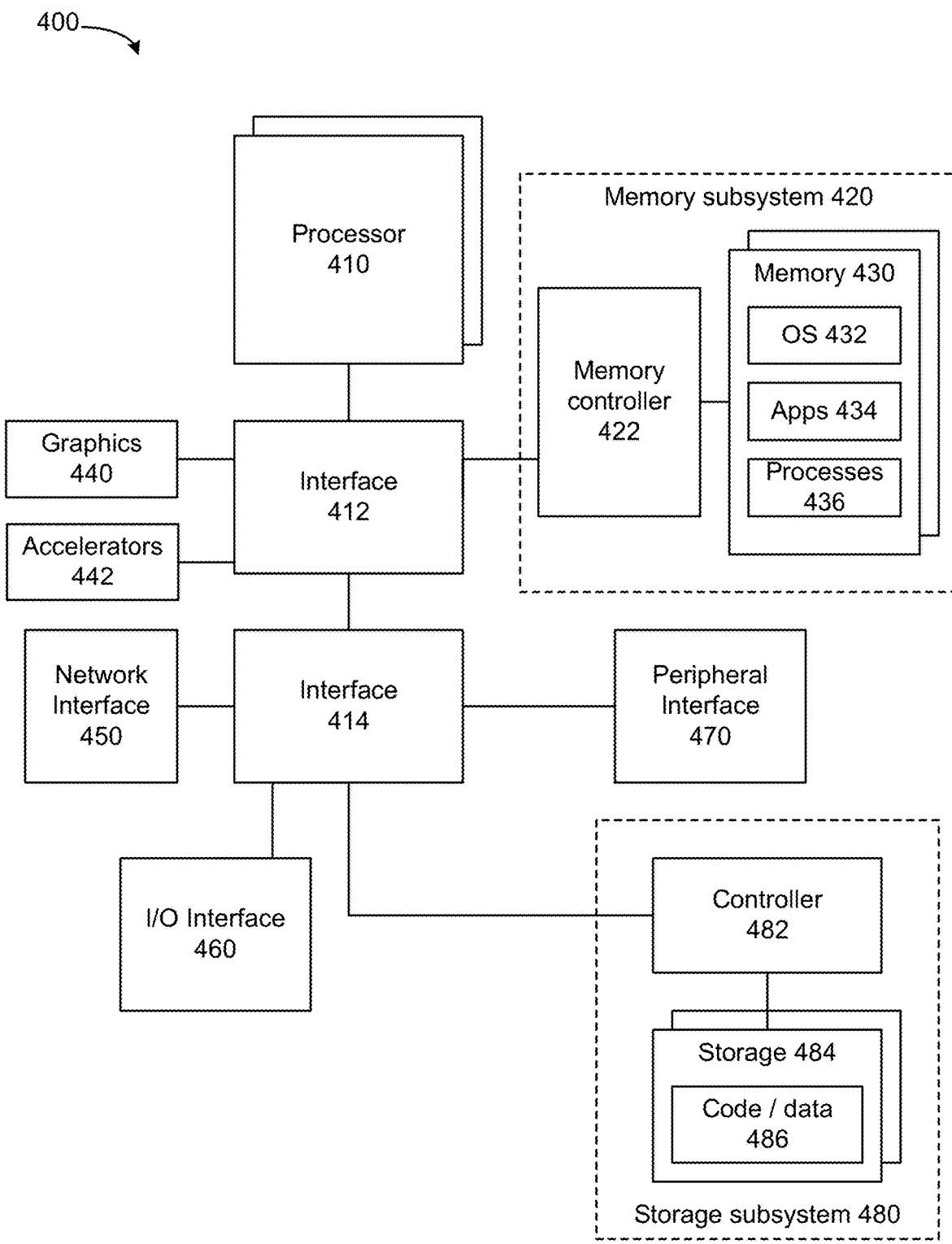
FIG. 4 depicts a system.

FIG. 4 depicts a system. The system can use embodiments described herein to provide data to or from the system to another device through a mesh or fabric. System 400 includes processor 410, which provides processing, operation management, and execution of instructions for system 400. Processor 410 can include any type of microprocessor, central processing unit (CPU), graphics processing unit (GPU), processing core, or other processing hardware to provide processing for system 400, or a combination of processors. Processor 410 controls the overall operation of system 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 400 includes interface 412 coupled to processor 410, which can represent a higher speed interface or a high throughput interface for system components that needs higher bandwidth connections, such as memory subsystem 420 or graphics interface components 440, or accelerators 442. Interface 412 represents an interface circuit, which can be a standalone component or integrated onto a processor die. Where present, graphics interface 440 interfaces to graphics components for providing a visual display to a user of system 400. In one example, graphics interface 440 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 440 generates a display based on data stored in memory 430 or based on operations executed by processor 410 or both. In one example, graphics interface 440 generates a display based on data stored in memory 430 or based on operations executed by processor 410 or both.

Accelerators 442 can be a fixed function offload engine that can be accessed or used by a processor 410. For example, an accelerator among accelerators 442 can provide compression (DC) capability, cryptography services such as public key encryption (PKE), cipher, hash/authentication capabilities, decryption, or other capabilities or services. In some embodiments, in addition or alternatively, an accelerator among accelerators 442 provides field select controller capabilities as described herein. In some cases, accelerators 442 can be integrated into a CPU socket (e.g., a connector to a motherboard or circuit board that includes a CPU and provides an electrical interface with the CPU). For example, accelerators 442 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 442 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 420 represents the main memory of system 400 and provides storage for code to be executed by processor 410, or data values to be used in executing a routine. Memory subsystem 420 can include one or more memory devices 430 such as read-only memory (ROM), flash memory, one or more varieties of random access memory (RAM) such as DRAM, or other memory devices, or a combination of such devices. Memory 430 stores and hosts, among other things, operating system (OS) 432 to provide a software platform for execution of instructions in system 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software logic to provide functions for system 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410.

While not specifically illustrated, it will be understood that system 400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 400 includes interface 414, which can be coupled to interface 412. In one example, interface 414 represents an interface circuit, which can include standalone components and integrated circuitry. In one example, multiple user interface components or peripheral components, or both, couple to interface 414. Network interface 450 provides system 400 the ability to communicate with remote devices (e.g., servers or other computing devices) over one or more networks. Network interface 450 can include an Ethernet adapter, wireless interconnection components, cellular network interconnection components, USB (universal serial bus), or other wired or wireless standards-based or proprietary interfaces. Network interface 450 can transmit data to a device that is in the same data center or rack or a remote device, which can include sending data stored in memory. Network interface 450 can receive data from a remote device, which can include storing received data into memory. Various embodiments can be used in connection with network interface 450, processor 410, and memory subsystem 420.

In one example, system 400 includes one or more input/output (I/O) interface(s) 460. I/O interface 460 can include one or more interface components through which a user interacts with system 400 (e.g., audio, alphanumeric, tactile/touch, or other interfacing). Peripheral interface 470 can include any hardware interface not specifically mentioned above. Peripherals refer generally to devices that connect dependently to system 400. A dependent connection is one where system 400 provides the software platform or hardware platform or both on which operation executes, and with which a user interacts.

In one example, system 400 includes storage subsystem 480 to store data in a nonvolatile manner. In one example, in certain system implementations, at least certain components of storage 480 can overlap with components of memory subsystem 420. Storage subsystem 480 includes storage device(s) 444, which can be or include any conventional medium for storing large amounts of data in a nonvolatile manner, such as one or more magnetic, solid state, or optical based disks, or a combination. Storage 444 holds code or instructions and data 446 in a persistent state (i.e., the value is retained despite interruption of power to system 400). Storage 444 can be generically considered to be a "memory," although memory 430 is typically the executing or operating memory to provide instructions to processor 410. Whereas storage 444 is nonvolatile, memory 430 can include volatile memory (i.e., the value or state of the data is indeterminate if power is interrupted to system 400). In one example, storage subsystem 480 includes controller 482 to interface with storage 484. In one example controller 482 is a physical part of interface 414 or processor 410 or can include circuits or logic in both processor 410 and interface 414.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 400. More specifically, power source typically interfaces to one or multiple power supplies in system 400 to provide power to the components of system 400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 400 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 5:
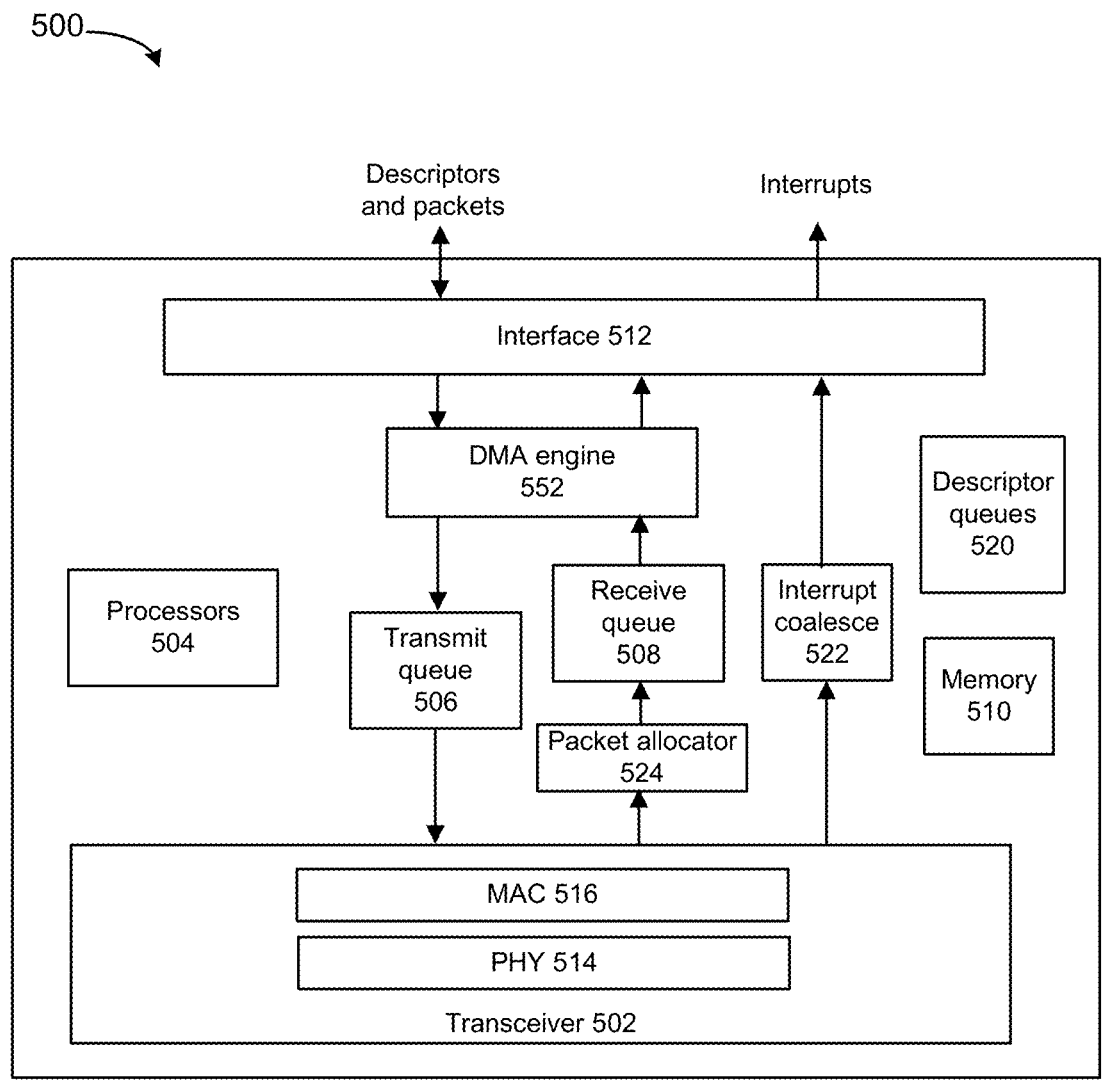
FIG. 5 depicts a network interface that can use embodiments or be used by embodiments.

FIG. 5 depicts a network interface that can use embodiments or be used by embodiments. For example, for packets that are to be transmitted by network interface 500, an intermediate queue or egress queue can be selected for use based on embodiments described herein. Network interface 500 can include transceiver 502, processors 504, transmit queue 506, receive queue 508, memory 510, and bus interface 512, and DMA engine 552. Transceiver 502 can be capable of receiving and transmitting packets in conformance with the applicable protocols such as Ethernet as described in IEEE 802.3, although other protocols may be used. Transceiver 502 can receive and transmit packets from and to a network via a network medium (not depicted). Transceiver 502 can include PHY circuitry 514 and media access control (MAC) circuitry 516. PHY circuitry 514 can include encoding and decoding circuitry (not shown) to encode and decode data packets according to applicable physical layer specifications or standards. MAC circuitry 516 can be configured to assemble data to be transmitted into packets, that include destination and source addresses along with network control information and error detection hash values. MAC circuitry 516 can be configured to process MAC headers of received packets by verifying data integrity, removing preambles and padding, and providing packet content for processing by higher layers.

Processors 504 can be any a combination of a: processor, core, graphics processing unit (GPU), field programmable gate array (FPGA), application specific integrated circuit (ASIC), or other programmable hardware device that allow programming of network interface 500. For example, processors 504 can provide for allocation or deallocation of intermediate queues. For example, a "smart network interface" can provide packet processing capabilities in the network interface using processors 504.

Packet allocator 524 can provide distribution of received packets for processing by multiple CPUs or cores using timeslot allocation described herein or RSS. When packet allocator 524 uses RSS, packet allocator 524 can calculate a hash or make another determination based on contents of a received packet to determine which CPU or core is to process a packet.

Interrupt coalesce 522 can perform interrupt moderation whereby network interface interrupt coalesce 522 waits for multiple packets to arrive, or for a time-out to expire, before generating an interrupt to host system to process received packet(s). Receive Segment Coalescing (RSC) can be performed by network interface 500 whereby portions of incoming packets are combined into segments of a packet. Network interface 500 provides this coalesced packet to an application.

Direct memory access (DMA) engine 552 can copy a packet header, packet payload, and/or descriptor directly from host memory to the network interface or vice versa, instead of copying the packet to an intermediate buffer at the host and then using another copy operation from the intermediate buffer to the destination buffer.

Memory 510 can be any type of volatile or non-volatile memory device and can store any queue or instructions used to program network interface 500. Transmit queue 506 can include data or references to data for transmission by network interface. Receive queue 508 can include data or references to data that was received by network interface from a network. Descriptor queues 520 can include descriptors that reference data or packets in transmit queue 506 or receive queue 508. Bus interface 512 can provide an interface with host device (not depicted). For example, bus interface 512 can be compatible with PCI, PCI Express, PCI-x, Serial ATA, and/or USB compatible interface (although other interconnection standards may be used).

Figure 6:
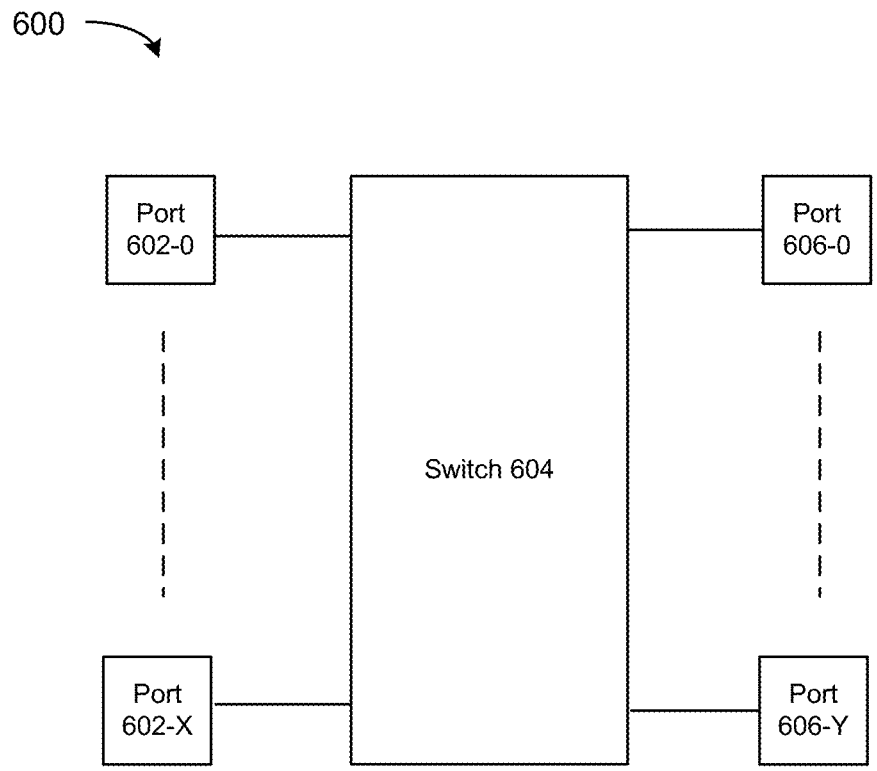
FIG. 6 depicts an example switch.

FIG. 6 depicts an example switch. Various embodiments can be used in or with the switch of FIG. 6. Switch 604 can route packets or frames of any format or in accordance with any specification from any port 602-0 to 602-X to any of ports 606-0 to 606-Y (or vice versa). Any of ports 602-0 to 602-X can be connected to a network of one or more interconnected devices. Similarly, any of ports 606-0 to 606-X can be connected to a network of one or more interconnected devices. Switch 604 can decide which port to transfer packets or frames to using a table that maps packet characteristics with an associated output port. In addition, switch 604 can perform packet replication for forwarding of a packet or frame to multiple ports and queuing of packets or frames prior to transfer to an output port.

Figure 7:
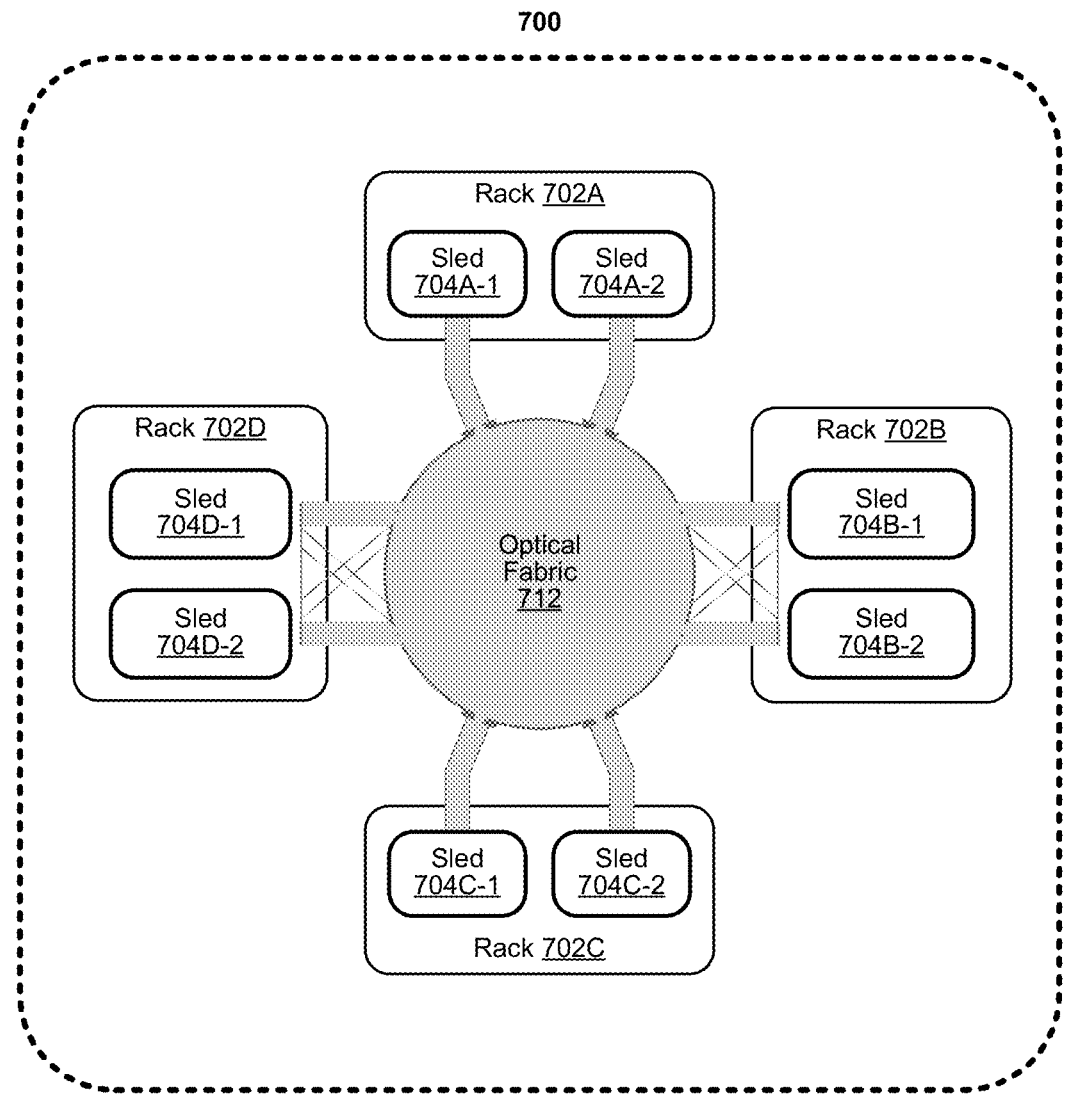
FIG. 7 depicts an example of a data center.

FIG. 7 depicts an example of a data center. A network device in data center can use embodiments described herein for queue allocation for packet transmissions within and outside of the data center. As shown in FIG. 7, data center 700 may include an optical fabric 712. Various embodiments can be used in fabric 712. Optical fabric 712 may generally include a combination of optical signaling media (such as optical cabling) and optical switching infrastructure via which any particular sled in data center 700 can send signals to (and receive signals from) the other sleds in data center 700. The signaling connectivity that optical fabric 712 provides to any given sled may include connectivity both to other sleds in a same rack and sleds in other racks. Data center 700 includes four racks 702A to 702D and racks 702A to 702D house respective pairs of sleds 704A-1 and 704A-2, 704B-1 and 704B-2, 704C-1 and 704C-2, and 704D-1 and 704D-2. Thus, in this example, data center 700 includes a total of eight sleds. Optical fabric 712 can provide sled signaling connectivity with one or more of the seven other sleds. For example, via optical fabric 712, sled 704A-1 in rack 702A may possess signaling connectivity with sled 704A-2 in rack 702A, as well as the six other sleds 704B-1, 704B-2, 704C-1, 704C-2, 704D-1, and 704D-2 that are distributed among the other racks 702B, 702C, and 702D of data center 700. The embodiments are not limited to this example. For example, fabric 712 can provide optical and/or electrical signaling.

Figure 8:
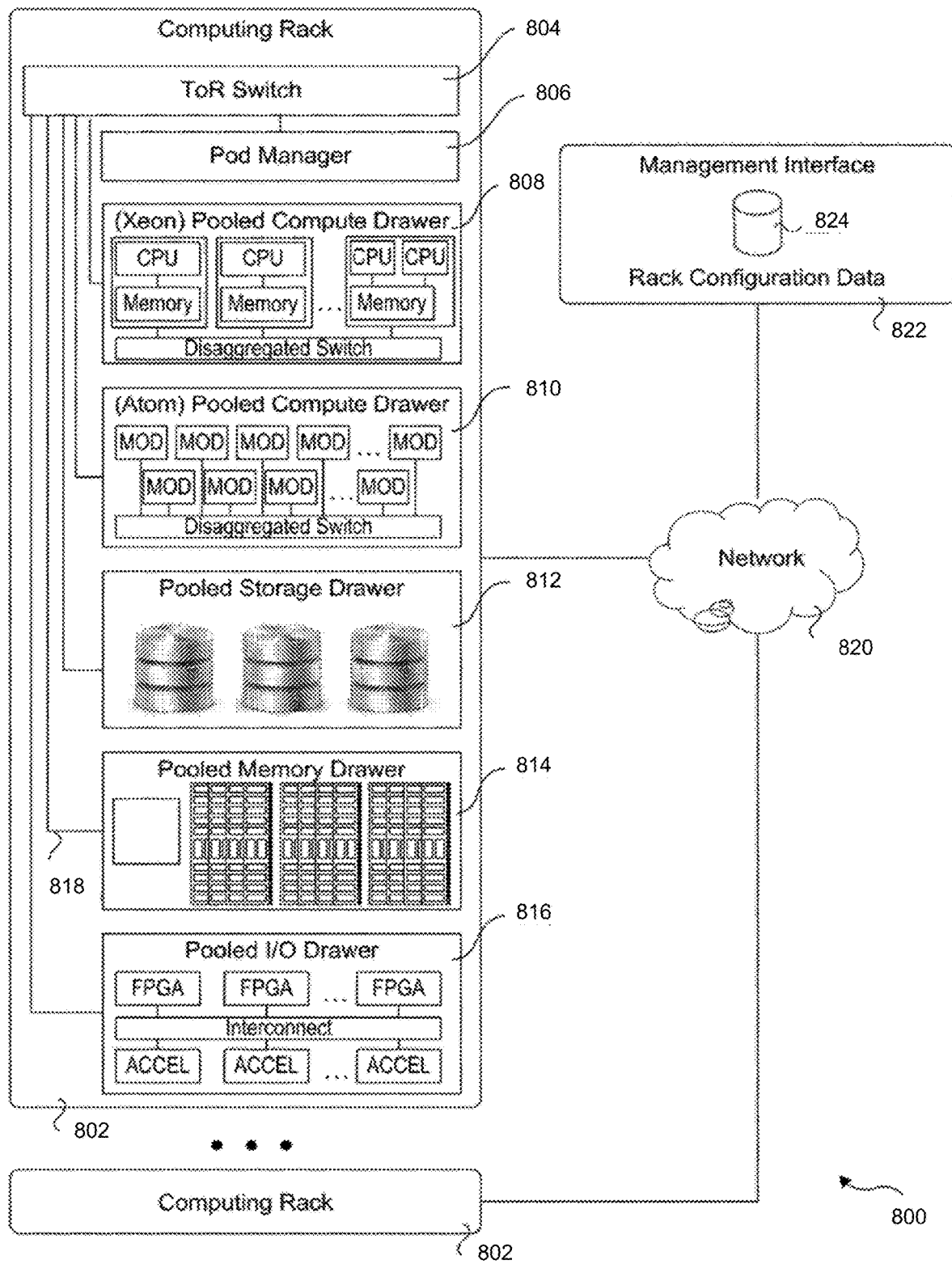
FIG. 8 depicts an environment.

FIG. 8 depicts an environment 800 includes multiple computing racks 802, each including a Top of Rack (ToR) switch 804, a pod manager 806, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 808, and Intel® ATOM™ pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+Gb/s Silicon Photonics (SiPh) optical link. In one embodiment high-speed link 818 comprises an 800 Gb/s SiPh optical link.

Multiple of the computing racks 800 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items.

The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes a network device comprising: an ingress port to receive packets; a processor to determine a flow associated with received packets; and a queue assigner to determine an intermediate queue from a set of intermediate queues to assign to the received packets based on a policy, wherein the set of intermediate queues comprises one or more of: a first type of intermediate queue that has an associated average throughput level or a second type of intermediate queue that is deeper than the first type of intermediate queue and is expandable in size.

Example 2 includes any example, wherein the set of intermediate queues comprises a third type of intermediate queue that is expandable in size but shallower than the second type of intermediate queue.

Example 3 includes any example, wherein the policy comprises an allocation of an intermediate queue based on one or more of: egress port congestion, egress port incast, or flow life length.

Example 4 includes any example and includes an egress port; a scheduler; and at least one egress queue associated with the egress port, the at least one egress queue to receive packets from one or more intermediate queues and the scheduler to schedule transmission of packets from an egress queue.

Example 5 includes any example, wherein the first type of intermediate queue comprises an intermediate queue with a guaranteed maximum ingress-to-egress port latency time and packets can be dropped from the first type of intermediate queue due to overflow.

Example 6 includes any example, wherein the first type of intermediate queue comprises an egress queue for one or more egress ports.

Example 7 includes any example, wherein the second type of intermediate queue is expanded based on packet drop from the second type of intermediate queue.

Example 8 includes any example, wherein the second type of intermediate queue is associated with no guarantee on maximum end-to-end latency.

Example 9 includes any example, wherein the third type of intermediate queue is expanded based on egress port congestion or incast detection.

Example 10 includes any example, wherein the intermediate queues are allocated in a memory device.

Example 11 includes any example, wherein the queue assigner is to deallocate an intermediate queue allocated to a flow based on changes in one or more of: egress port congestion, egress port incast, or flow life length.

Example 12 includes any example and includes one or more of: a server, data center, rack, network interface, or host computer.

Example 13 includes a method performed in a network device where the method includes: receiving a request for an intermediate queue and allocating an intermediate queue from a set of intermediate queues based on an applicable policy, the set of intermediate queues comprising at least: a first type of intermediate queue that is not expandable and has an associated throughput level, a second type of intermediate queue that is expandable, or a third type of intermediate queue that is deeper than the second type of intermediate queue and is expandable.

Example 14 includes any example, wherein the policy comprises an allocation of an intermediate queue based on one or more of: egress port congestion, egress port incast, or flow life length.

Example 15 includes any example, wherein: the first type of intermediate queue comprises a shallow intermediate queue with a guaranteed maximum ingress-to-egress port latency time and permits dropping of packets due to overflow, the second type of intermediate queue is expandable in an event of a congestion event or incast detection, and the third type of intermediate queue is expanded if a packet drop occurs and the third type of intermediate queue provides no guarantee on maximum end-to-end latency.

Example 16 includes any example and includes deallocating an intermediate queue based on end of a flow.

Example 17 includes any example, wherein allocating an intermediate queue from a set of intermediate queues based on an applicable policy comprises considering telemetry data, the telemetry data comprising congestion level at an egress port, bandwidth utilization at an ingress port, bandwidth utilization at egress port, or bandwidth utilized by a specific flow.

Example 18 includes a system that includes one or more processors; a memory; and a network device to receive a packet to be egressed to a network medium, the network device to determine an intermediate queue to allocate to the packet, the network device to allocate an intermediate queue in the memory to the packet based on one or more of: level or permitted latency of receipt to transmit, sensitivity to packet drop, or flow life length and assign the packet to the allocated intermediate queue.

Example 19 includes any example, wherein based on an end of a flow associated with the packet, the network device is to deallocate an intermediate queue and allow any portion of the deallocated queue to be used for allocation of another intermediate queue.

Example 20 includes any example, wherein: a first type of intermediate queue comprises a shallow intermediate queue with a guaranteed maximum ingress-to-egress port latency time and permits dropping of packets due to overflow, a second type of intermediate queue is expandable based on a congestion event or incast detection, and a third type of intermediate queue is expanded if a packet drop occurs and the third type of intermediate queue provides no guarantee on maximum end-to-end latency.

Example 21 includes any example, wherein the intermediate queues are allocated in the memory.

What is claimed is:

1. An apparatus comprising:
a network interface device comprising:
circuitry to determine a queue, from among multiple queues, in which to store a received packet of a flow and dynamically change a type of queue to store a second received packet of the flow based on latency and quality of service (QoS) parameters, wherein the second received packet has different associated latency and/or QoS parameter than latency and/or QoS parameter associated with the received packet, the received packet is received from a second network interface device, the second received packet is received from the second network interface device, the multiple queues have different characteristics, and the characteristics comprise queue size and expandability.

2. The apparatus of claim 1, wherein the multiple queues comprise intermediate queues.

3. The apparatus of claim 1, wherein a first queue of the multiple queues comprises an egress queue and has an associated average throughput level.

4. The apparatus of claim 1, wherein a first queue of the multiple queues comprises an egress queue and has an associated time to egress a packet after the packet is stored in the first queue.

5. The apparatus of claim 1, wherein a first queue of the multiple queues comprises an egress queue and has a guaranteed maximum ingress-to-egress port latency time and packets are permitted to be dropped from the first queue due to overflow.

6. The apparatus of claim 1, wherein
a first queue of the multiple queues is a first size and expandable in size,
a second queue of the multiple queues is a second size and expandable in size, and
the second size is smaller than the first size.

7. The apparatus of claim 6, wherein the first queue is expanded based on occurrence of one or more packet drops.

8. The apparatus of claim 6, wherein the first queue is associated with no guarantee on maximum end-to-end latency.

9. The apparatus of claim 6, wherein the second queue is expanded based on egress port congestion or incast detection.

10. The apparatus of claim 1, wherein the circuitry to determine a queue, from among multiple queues, in which to store a received packet of a flow is to determine a queue based on one or more of: egress port congestion, egress port incast, or flow life length.

11. The apparatus of claim 1, comprising circuitry to deallocate a queue allocated to one or more packets based on changes in one or more of: egress port congestion, egress port incast, or flow life length.

12. The apparatus of claim 1, wherein the network interface device comprises
an egress port;
a scheduler; and
at least one egress queue associated with the egress port, the at least one egress queue to receive packets from one or more queues of the multiple queues and the scheduler is to schedule transmission of packets from an egress queue.

13. The apparatus of claim 1, comprising one or more of: a server, data center, rack, network interface, or host computer and wherein the one or more of: a server, data center, rack, network interface, or host computer is to transmit one or more packets to the network interface device and wherein the transmitted one or more packets are subject to a quality of service (QoS) policy.

14. A non-transitory computer-readable medium comprising instructions stored thereon, that if executed by one or more processors, cause the one or more processors to:
configure a switch to
determine a queue, from among multiple queues, in which to store a received packet of a flow and dynamically change a type of queue to store a second received packet of the flow based on latency and quality of service (QoS) parameters, wherein the second received packet has different associated latency and/or QoS parameter than latency and/or QoS parameter associated with the received packet, the received packet is received from a second network interface device, the second received packet is received from the second network interface device, the multiple queues have different characteristics, and the characteristics comprise queue size and expandability.

15. The computer-readable media of claim 14, wherein the multiple queues comprise intermediate queues.

16. The computer-readable media of claim 14, wherein a first queue of the multiple queues comprises an egress queue and has an associated average throughput level.

17. The computer-readable media of claim 14, wherein a first queue of the multiple queues comprises an egress queue and has an associated time to egress a packet after the packet is stored in the first queue.

18. The computer-readable media of claim 14, wherein a first queue of the multiple queues comprises an egress queue and has a guaranteed maximum ingress-to-egress port latency time and packets are permitted to be dropped from the first queue due to overflow.

19. The computer-readable media of claim 14, wherein
a first queue of the multiple queues is a first size and expandable in size,
a second queue of the multiple queues is a second size and expandable in size, and the second size is smaller than the first size.

20. The computer-readable media of claim 19, wherein the first queue is expanded based on occurrence of one or more packet drops.

21. The computer-readable media of claim 19, wherein the first queue is associated with no guarantee on maximum end-to-end latency.

22. The computer-readable media of claim 19, wherein the second queue is expanded based on egress port congestion or incast detection.

* * * * *